US010082342B2

(12) United States Patent
Uchida

(10) Patent No.: US 10,082,342 B2
(45) Date of Patent: Sep. 25, 2018

(54) COMBUSTION ASSISTING FLUID PREHEATING DEVICE FOR OXYGEN COMBUSTION SYSTEM

(71) Applicant: IHI Corporation, Koto-ku (JP)

(72) Inventor: Terutoshi Uchida, Koto-ku (JP)

(73) Assignee: IHI Corporation, Koto-ku (JP)

( * ) Notice: Subject to any disclaimer, the term of this patent is extended or adjusted under 35 U.S.C. 154(b) by 210 days.

(21) Appl. No.: 15/070,570

(22) Filed: Mar. 15, 2016

(65) Prior Publication Data

US 2016/0195338 A1 Jul. 7, 2016

Related U.S. Application Data

(63) Continuation of application No. PCT/JP2014/075979, filed on Sep. 30, 2014.

(30) Foreign Application Priority Data

Oct. 3, 2013 (JP) ................. 2013-208122

(51) Int. Cl.
*F28D 19/04* (2006.01)
*F23L 15/02* (2006.01)
(Continued)

(52) U.S. Cl.
CPC ................ *F28D 19/04* (2013.01); *F23C 9/00* (2013.01); *F23L 7/007* (2013.01); *F23L 15/02* (2013.01);
(Continued)

(58) Field of Classification Search
CPC .. F23L 7/007; F23L 15/02; F23C 9/00; F28D 19/04; Y02E 20/322; Y02E 20/344; Y02E 20/348
See application file for complete search history.

(56) References Cited

U.S. PATENT DOCUMENTS

| 5,915,340 A | 6/1999 | Cronin et al. |
| 2009/0013941 A1 | 1/2009 | Alexander et al. |

(Continued)

FOREIGN PATENT DOCUMENTS

| JP | 61-107002 | 5/1986 |
| JP | 2000-505874 | 5/2000 |

(Continued)

OTHER PUBLICATIONS

International Search Report dated Jan. 6, 2015 in PCT/JP2014/075979, filed on Sep. 30, 2014.

*Primary Examiner* — Alfred Basichas
(74) *Attorney, Agent, or Firm* — Oblon, McClelland, Maier & Neustadt, L.L.P.

(57) ABSTRACT

Provided are regenerative rotary preheater having flue gas flow passage through which passed is flue gas from oxyfuel combustion boiler, primary-combustion-support-fluid flow passage adjacent to the flue gas flow passage and through which passed is primary combustion support fluid with pressure higher than that of the flue gas, secondary-combustion-support-fluid flow passage adjacent to the flue gas flow passage and through which passed is secondary combustion support fluid with pressure higher than that of the flue gas and oxygen flow passage between the primary- and secondary-combustion-support-fluid flow passages and through which oxygen is passed, and an oxygen mixing section mixing the fluid preheated through the secondary-combustion-support passage with oxygen preheated through the oxygen flow passage and supplies the mixture to the oxyfuel combustion boiler.

6 Claims, 3 Drawing Sheets

(51) Int. Cl.
*F23L 7/00* (2006.01)
*F23C 9/00* (2006.01)

(52) U.S. Cl.
CPC ........... *Y02E 20/322* (2013.01); *Y02E 20/344* (2013.01); *Y02E 20/348* (2013.01)

(56) References Cited

U.S. PATENT DOCUMENTS

2011/0250551 A1 10/2011 McDonald
2013/0244190 A1 9/2013 Marumoto et al.

FOREIGN PATENT DOCUMENTS

| JP | 2011-220667 | 11/2011 |
| WO | WO 2012/035777 A1 | 3/2012 |

COMBUSTION ASSISTING FLUID PREHEATING DEVICE FOR OXYGEN COMBUSTION SYSTEM

TECHNICAL FIELD

The present disclosure relates to a combustion-support-fluid preheating device for an oxyfuel combustion system to preheat combustion support fluid to be supplied to an oxyfuel combustor.

BACKGROUND ART

Some coal-fired boilers are provided with a regenerative rotary preheater which preheats, through heat exchange with flue gas from the boiler, primary and secondary airs (primary and secondary combustion support fluids) for supply of pulverized coal to the boiler and for stable combustion of the boiler, respectively, and supplies the primary and secondary combustion support fluids to the boiler.

Moreover, an oxyfuel combustion boiler has been proposed nowadays which uses not air but oxygen to burn the pulverized coal. In the oxyfuel combustion boiler, flue gas mainly composed of $CO_2$ (carbon dioxide) is drawn from the oxyfuel combustion boiler as primary and secondary recirculation gases (primary and secondary combustion support fluids) which are guided to a regenerative rotary preheater and are preheated through heat exchange with the flue gas. The secondary combustion support fluid upstream of the regenerative rotary preheater is mixed with oxygen from an air separation unit (ASU) and the secondary combustion support fluid mixed with the oxygen is supplied to the boiler. In oxyfuel combustion of pulverized coal in the oxyfuel combustion boiler, a flow rate of the secondary combustion support fluid 12 to be mixed with the oxygen may be controlled to properly control a combustion temperature of the oxyfuel combustion boiler.

The oxyfuel combustion boiler has attracted attention as an effective device for withdrawal and disposal of $CO_2$ since flue gas mainly composed of $CO_2$ (carbon dioxide) is discharged from the oxyfuel combustion boiler in the oxyfuel combustion of the pulverized coal as mentioned in the above.

The flue gas of the oxyfuel combustion boiler, which is induced by an induced fan, has negative pressure (low pressure). By contrast, the secondary combustion support fluid, which is boosted in pressure by a forced draft fan for supply to the oxyfuel combustion boiler, has a given pressure (medium pressure); the primary combustion support fluid, which is passed through the mill to transport the pulverized coal to the oxyfuel combustion boiler, is boosted in pressure by boost-up and primary draft fans into a highest pressure (high pressure). Specifically, pressure relationship is: pressure of the flue gas<pressure of the secondary combustion support fluid<pressure of the primary combustion support fluid.

The regenerative rotary preheater is provided with sector plates arranged adjacent to axially opposite ends of a rotating rotor, respectively, to compart openings at the axially opposite ends of the rotor. The sector plates compart a flue gas flow passage through which passed axially of the rotor is the low-pressure (negative-pressure) flue gas, a primary-combustion-support-fluid flow passage through which passed axially of the rotor is the high-pressure primary combustion support fluid comprising the recirculated flue gas boosted to the given pressure and a secondary-combustion-support-fluid flow passage through which passed axially of the rotor is the medium-pressure secondary combustion support fluid comprising the recirculated flue gas mixed with the oxygen and having the pressure higher than that of the flue gas and lower than that of the primary combustion support fluid, adjacent to one another. The rotor filled with a great number of thermal storage plates has partition plates radially extending to circumferentially partition the rotor into many sections. Each of the partition plates has opposite ends axially of the rotor each having a seal plate for gas sealing with the sector plate.

The flue gas is passed through the flue gas flow passage in the regenerative rotary preheater from above to below whereas the primary and secondary combustion support fluids are passed through the primary- and secondary-combustion-support-fluid flow passages from below to above, thereby providing the mutually opposed flows. The flue gas flow passage and the primary- and secondary-combustion-support-fluid flow passages are mutually partitioned in a gas sealed manner by the sector plates and the seal plates.

However, between the flue gas and the primary and secondary combustion support fluids flowing through the regenerative rotary preheater, there is direct leak of gas in relatively large quantity from higher to lower pressure sides through between the sector plates and the seal plates. There is also entrained leak of gas to an adjacent flow passage in an entrained manner in association with rotation of the rotor. Leaked quantity by the entrained leak is small in comparison with that by the direct leak.

The medium-pressure secondary combustion support fluid in the secondary-combustion-support-fluid flow passage provides direct leak in relatively large quantity to the neighboring flue gas flow passage through which passed is the low-pressure flue gas. As a result, when the secondary combustion support fluid preliminarily mixed with the oxygen leaks to the flue gas flow passage, the leaking oxygen is uselessly discharged together with the flue gas with no contribution to fuel combustion. Thus, the more the oxygen leaks to the flue gas, the more a capacity of the air separation unit (ASU) must be increased, leading to a problem of increase in installation and running costs.

In order to prevent the secondary combustion support fluid in the secondary-combustion-support-fluid flow passage from directly leaking to the flue gas flow passage, it has been proposed to position two primary-combustion-support-fluid flow passages between a flue gas flow passage and a secondary-combustion-support-fluid flow passage (Patent Literature 1).

CITATION LIST

Patent Literature

Patent Literature 1: JP 2011-220667A

SUMMARY

Technical Problems

In Patent Literature 1, the two primary-combustion-support-fluid flow passages through which passed is the high-pressure primary combustion support fluid are arranged between the flue gas flow passage and the secondary-combustion-support-fluid flow passage so as to prevent the flue gas flow passage through which passed is the low-pressure flue gas and the secondary-combustion-support-fluid flow passage through which passed is the medium-pressure secondary combustion support fluid from abutting each other. Thus, though the high-pressure primary combustion support fluid in the primary-combustion-support-fluid flow passage directly leaks to the flue gas flow passage and secondary-combustion-support-fluid flow passage with lower pressures, the secondary combustion support fluid in the secondary-combustion-support-fluid flow passage is prevented from directly leaking to the flue gas flow passage.

However, Patent Literature 1 has a problem that the two primary-combustion-support-fluid flow passages through which passed is the high-pressure primary combustion support fluid is adjacent to the low-pressure flue gas flow passage so that the high-pressure primary combustion support fluid directly leaks in large quantity to the low-pressure flue gas flow passage, which brings about a further problem that a running cost is increased due to required increase in motivity of the boost-up and primary draft fans for the supply of the primary combustion support fluid or that an installation cost is increased due to required increase in capacity of the boost-up and primary draft fans.

The disclosure was made in view of the above-mentioned conventional problems and has its object to provide a combustion-support-fluid preheating device for an oxyfuel combustion system which can prevent oxygen from leaking to a flue gas side with a simple structure and can decrease fan motivity and installation cost for supply of combustion support fluids to an oxyfuel combustor.

Solution to Problems

A combustion-support-fluid preheating device for an oxyfuel combustion system according to the disclosure is characterized in that it comprises a regenerative rotary preheater comprising a flue gas flow passage through which passed is flue gas from the oxyfuel combustor, a primary-combustion-support-fluid flow passage adjacent to the flue gas flow passage and through which passed is primary combustion support fluid with higher pressure than that of the flue gas, a secondary-combustion-support-fluid flow passage adjacent to the flue gas flow passage and through which passed is secondary combustion support fluid with higher pressure than that of the flue gas and an oxygen flow passage between the primary- and secondary-combustion-support-fluid flow passages and through which oxygen is passed and an oxygen mixing section where the secondary combustion support fluid preheated through passing thereof through the secondary-combustion-support-fluid flow passage is mixed with the oxygen preheated through passing thereof through the oxygen flow passage and is supplied to the oxyfuel combustor.

The combustion-support-fluid preheating device for the oxyfuel combustion system may further comprise a communication passage for connecting a secondary-combustion-support-fluid supply flow passage for supply of the secondary combustion support fluid to the secondary-combustion-support-fluid flow passage in the regenerative rotary preheater and an oxygen supply flow passage for supply of the oxygen to the oxygen flow passage in the regenerative rotary preheater, the communication passage being provided with oxygen concentration controller for premixing part of the secondary combustion support fluid in the secondary combustion support fluid supply flow passage into the oxygen supply flow passage to control an oxygen concentration in the oxygen flow passage.

In the combustion-support-fluid preheating device for the oxyfuel combustion system, the oxyfuel combustor may be an oxyfuel combustion boiler.

Advantageous Effects

The disclosure can exhibit excellent effects that oxygen can be prevented from leaking to a flue gas side with a simple structure and that fan motivity and installation cost for supply of combustion support fluids to an oxyfuel combustor can be reduced.

DESCRIPTION OF EMBODIMENT

Next, an embodiment of the disclosure will be described in conjunction with the drawings.

Figure 2:
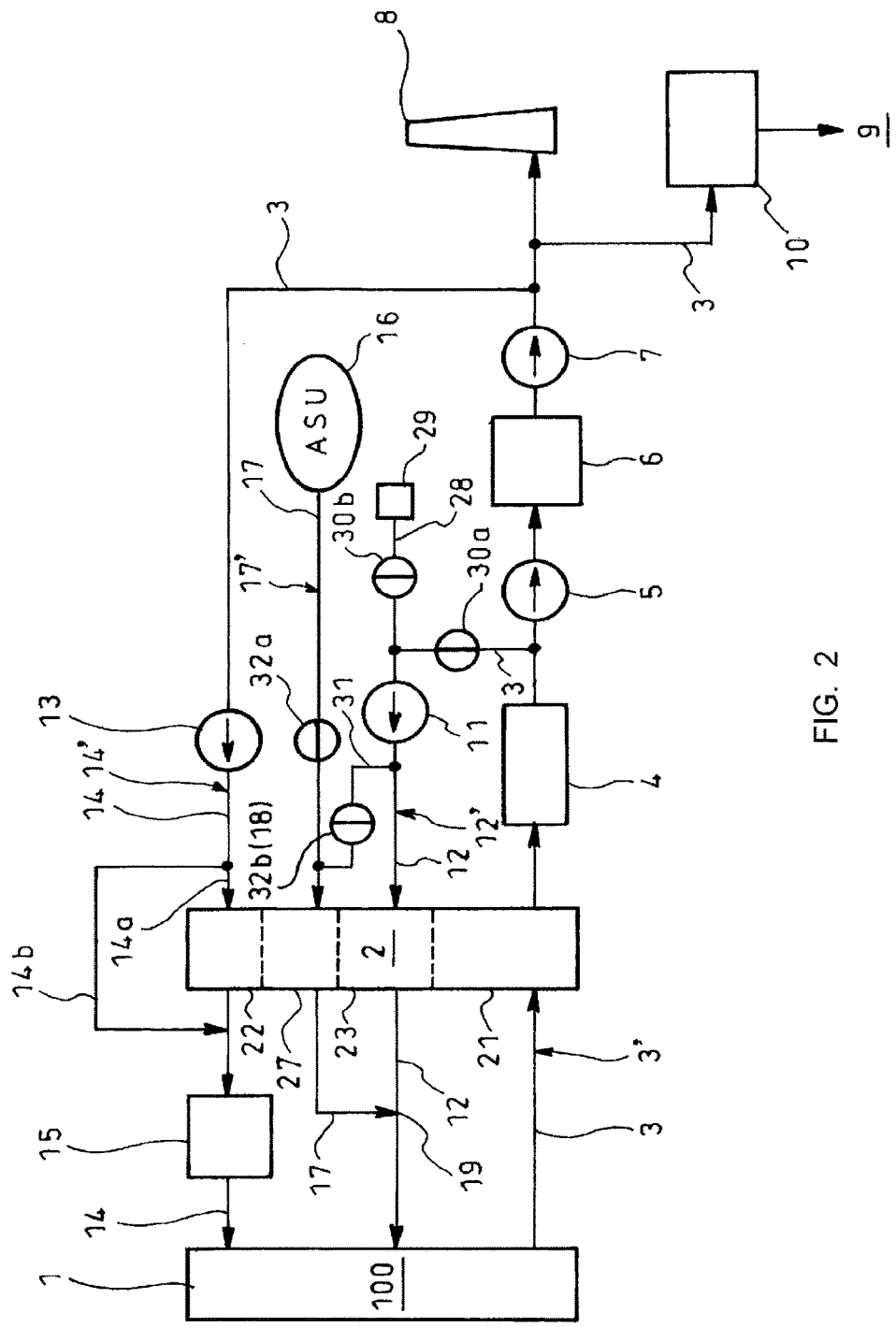
FIG. 2 is a block diagram schematically showing an embodiment of a combustion-support-fluid preheating device according to the disclosure applied to an oxyfuel combustion boiler system as oxyfuel combustion system.

FIG. 2 schematically shows the embodiment in which a combustion-support-fluid preheating device according to the disclosure is applied to an oxyfuel combustion boiler as an oxyfuel combustion system. The oxyfuel combustion system shown in FIG. 2 comprises an oxyfuel combustion boiler 1 as an oxyfuel combustor 100 and a regenerative rotary preheater 2 providing a combustion-support-fluid preheating device.

Flue gas 3 mainly composed of carbon dioxide ($CO_2$) and discharged from an oxyfuel combustion boiler 1 (oxyfuel combustor 100) through a flue gas duct 3' is guided to a flue gas flow passage 21 in the regenerative rotary preheater 2, is guided to a flue gas cooler 4 for cooling and is induced by an induced draft fan 5 (IDF) into a dehydrator 6 for dehydration. Then, the flue gas 3 is boosted in pressure by a boost-up fan 7 (BUF) and guided to a stack 8. Connected to an entry side of the stack 8 is an liquefier 10 into which the flue gas 3 ($CO_2$) is guided in a branched manner from the entry side of the stock 8 and is compressed and cooled into liquefied carbon dioxide 9.

The flue gas 3 on an entry side of the induced draft fan 5 is partly drawn as recirculated flue gas. The recirculated flue gas drawn is boosted in pressure by a forced draft fan 11 (FDF) in a secondary-combustion-support-fluid supply flow passage 12' to provide secondary combustion support fluid 12. The secondary combustion support fluid 12 is introduced into a secondary-combustion-support-fluid flow passage 23 in the regenerative rotary preheater 2 and is preheated through heat exchange with the flue gas 3 and then is supplied to the oxyfuel combustion boiler 1.

Moreover, part of the flue gas 3 boosted in pressure on an exit side of the boost-up fan 7 is drawn as recirculated flue gas. The recirculated flue gas drawn is further boosted in pressure by a primary draft fan 13 in a primary combustion support fluid supply flow passage 14' to provide primary combustion support fluid 14. Part 14a of the primary combustion support fluid 14 is introduced into the regenerative rotary preheater 2 and is heat exchanged with the flue gas 3 while the other part 14b thereof bypasses the regenerative rotary preheater 2 and is mixed with the heat-exchanged part 14a for temperature control. The primary combustion support fluid 14 controlled in temperature is supplied to a mill 15 for drying of the coal and for transport of the pulverized coal to the oxyfuel combustion boiler 1.

An air separation unit 16 (ASU) is arranged which produces oxygen 17 under a constant pressure. The oxygen 17 from the air separation unit 16 is introduced through an oxygen supply flow passage 17' to an oxygen flow passage 27 in the regenerative rotary preheater 2 and is preheated through heat exchange with the flue gas 3. The preheated oxygen 17 is mixed in an oxygen mixing section 19 with the secondary combustion support fluid 12 preheated in the secondary-combustion-support-fluid flow passage 23 and is supplied to the oxyfuel combustion boiler 1.

Connected to an entry side of the forced draft fan 11 (FDF) which boosts in pressure the secondary combustion support fluid 12 is an air intake port 29 which draws air 28 for air combustion upon activation of the oxyfuel combustion boiler 1. Provided are flow rate control dampers 30a and 30b for alternative introduction of the flue gas 3 and air 28 to the forced draft fan 11. The secondary-combustion-support-fluid supply flow passage 12' on an exit side of the forced draft fan 11 is connected to the oxygen supply flow passage 17' through a communication passage 31. For changeover of the air 28 to the oxygen supply flow passage 17' upon air combustion, arranged in the oxygen supply flow passage 17' is a flow rate controlling damper 32a at a position where the damper 32a is closer to the air separation unit 16 than a juncture of the passage 17' with the communication passage 31 is, and arranged in the communication passage 31 is a flow rate controlling damper 32b (oxygen concentration controller 18).

Figure 1A:
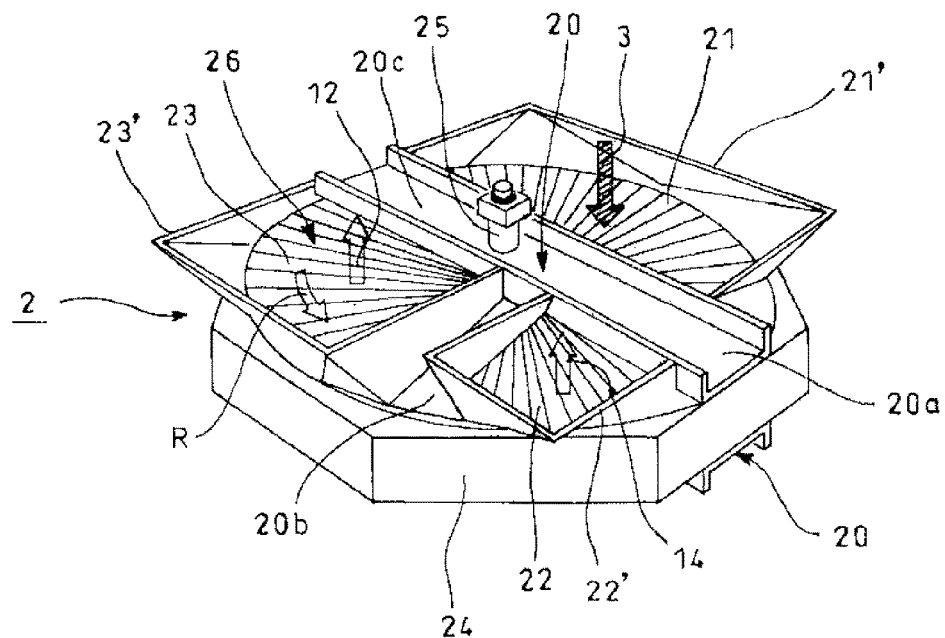
FIG. 1a is a perspective view showing a conventional typical constructional example of a regenerative rotary preheater.
Figure 1B:
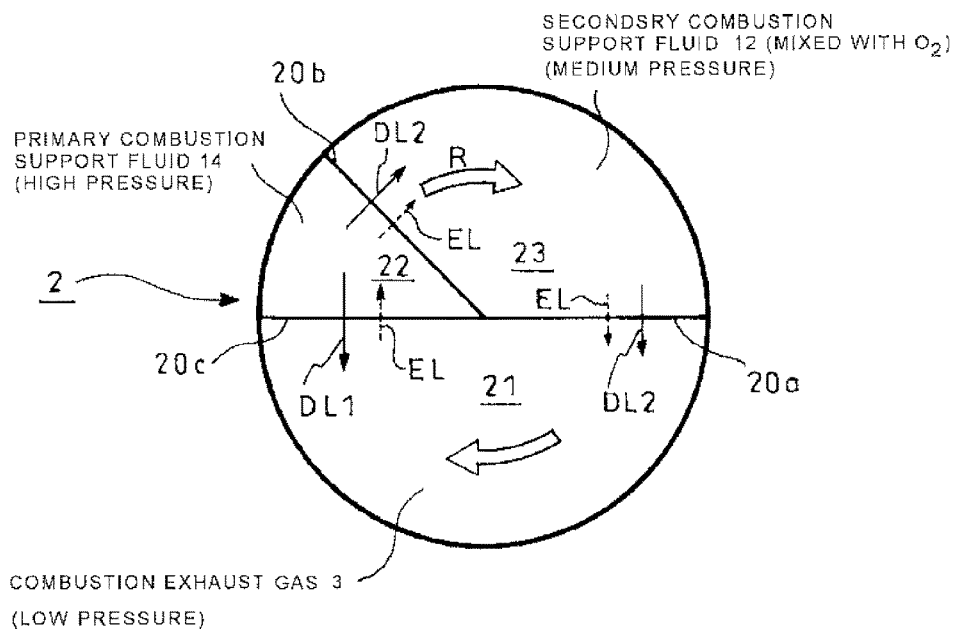
FIG. 1b is a schematic plan view looking the structure of FIG. 1a from above.

FIG. 1a shows the conventional typical constructional example of the regenerative rotary preheater 2 and FIG. 1b is the schematic plan view looking the structure of FIG. 1a from above. The regenerative rotary preheater 2 has a rotor 26 rotating in a direction of arrow R about a vertical shaft 25. Arranged adjacent to axially opposite ends of the rotor 26 are sector plates 20, respectively, each having three sector plate portions 20a, 20b and 20c for partitioning into a flue gas flow passage 21 for passing of the negative-pressure flue gas 3 axially of the rotor 26, a primary-combustion-support-fluid flow passage 22 for passing of the primary combustion support fluid 14 having a given pressure comprising the recirculated flue gas and a secondary-combustion-support-fluid flow passage 23 for passing of the secondary combustion support fluid 12 comprising the recirculated flue gas mixed with the oxygen $O_2$ and having a pressure higher than that of the flue gas 3 and lower than that of the primary combustion support fluid 14. In FIG. 1a, reference numerals 21', 22' and 23' denote ducts for communication with the flue gas flow passage 21, the primary-combustion-support-fluid flow passage 22 and the secondary-combustion-support-fluid flow passage 23, respectively; and 24, a casing of the rotor 26. The flue gas 3 is passed from above to below whereas the primary and secondary combustion support fluids 14 and 12 are passed from below to above, thereby providing the opposite flows. The respective partition plates circumferentially partitioning the thermal storage plates in the rotor 26 into a great number of sections has axially opposite ends axially of the rotor each having a seal plate (not shown) for gas sealing with the sector plate 20.

FIG. 1b shows quantity of direct leak DL by length of solid arrow in the typical regenerative rotary preheater 2 with the flue gas flow passage 21 and the primary- and secondary-combustion-support-fluid flow passages 22 and 23 adjacent to one another. The high-pressure primary combustion support fluid 14 in the primary-combustion-support-fluid flow passage 22 has direct leaks DL1 and DL2 in large and medium quantities to the adjacent low-pressure flue gas flow passage 21 and medium-pressure secondary-combustion-support-fluid flow passage 23, respectively. The medium-pressure secondary combustion support fluid 12 mixed with the oxygen $O_2$ in the secondary-combustion-support-fluid flow passage 23 has direct leak DL2 in medium quantity to the adjacent low-pressure flue gas flow passage 21.

In accordance with the rotation of the rotor 26 in the direction of arrow R and in line with the direction of rotation of the rotor 26, the primary combustion support fluid 14 in the primary-combustion-support-fluid flow passage 22 has entrained leak EL to the secondary-combustion-support-fluid flow passage 23 and the secondary combustion support fluid 12 in the secondary-combustion-support-fluid flow passage 23 has entrained leak EL to the flue gas flow passage 21 and the flue gas 3 in the flue gas flow passage 21 has entrained leak EL to the primary-combustion-support-fluid flow passage 22 as shown in dashed arrows in FIG. 1b. The entrained leaks EL are small relative to the direct leaks DL1 and DL2 so that explanation thereon is omitted here.

As mentioned in the above, the medium-pressure secondary combustion support fluid 12 mixed with the oxygen $O_2$ in the secondary-combustion-support-fluid flow passage 23 has the direct leak DL2 in medium quantity to the adjacent low-pressure flue gas flow passage 21 so that the oxygen $O_2$ leaked to the flue gas flow passage 21 is not used for fuel combustion in the oxyfuel combustion boiler 1 but is uselessly discharged together with the flue gas 3.

In order to overcome this, the Patent Literature 1 proposes the structure with two primary-combustion-support-fluid flow passages through which passed is the highest-pressure primary combustion support fluid being arranged between the flue gas flow passage and the secondary-combustion-support-fluid flow passage so as to prevent direct contact between the flue gas flow passage and the secondary-combustion-support-fluid flow passage. In Patent Literature 1, though the high-pressure primary combustion support fluid in the primary-combustion-support-fluid flow passages have direct leaks to the flue gas flow passage and to the secondary-combustion-support-fluid flow passage, the secondary combustion support fluid in the secondary-combustion-support-fluid flow passage is prevented from directly leaking to the flue gas flow passage.

However, in the structure of Patent Literature 1, the two high-pressure primary combustion support fluids 14 are adjacent to the low-pressure flue gas flow passage and thus the high-pressure primary combustion support fluids have direct leaks in large quantity to the flue gas flow passage, which disadvantageously increases motivity of the boost-up and primary fans for supply of the primary combustion support fluid or increases installation cost due to increase in capacity of the boost-up and primary fans.

Figure 3:
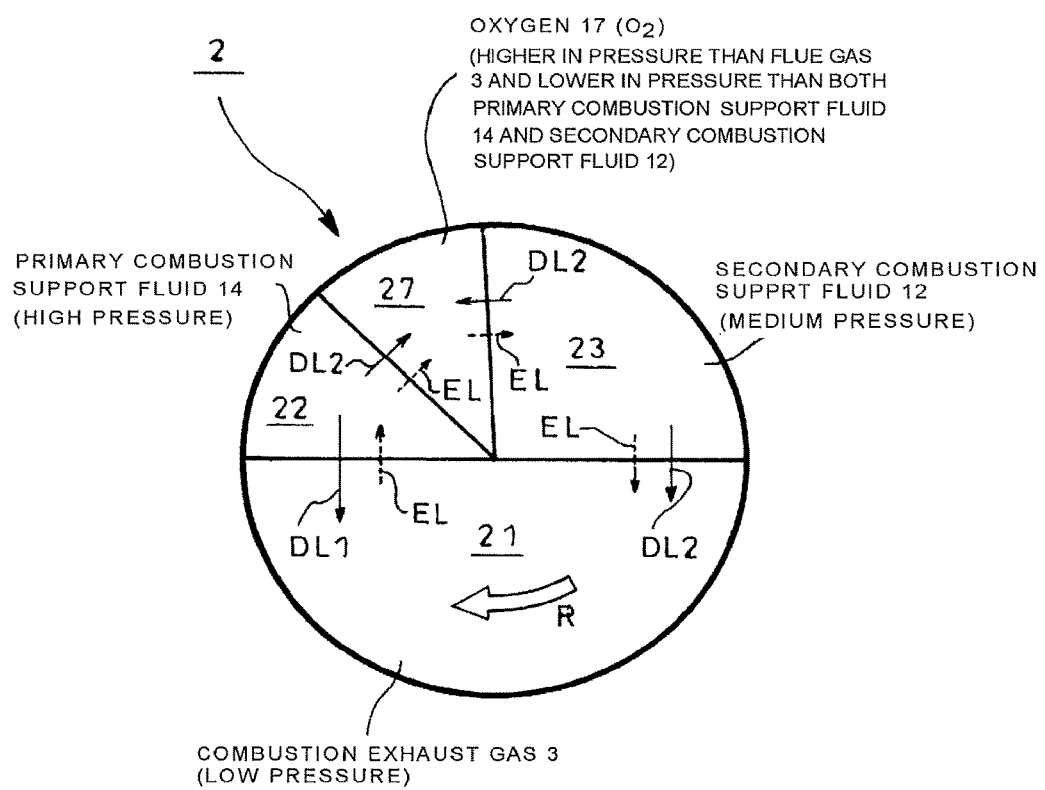
FIG. 3 is a plan view schematically showing a regenerative rotary preheater in the embodiment shown in FIG. 2.

In order to overcome this, as shown in FIGS. 2 and 3, the regenerative rotary preheater 2 according to the disclosure comprises the flue gas flow passage 21 through which passed is the low-pressure flue gas 3, the primary-combustion-support-fluid flow passage 22 adjacent to the flue gas flow passage 21 and through which passed is the primary combustion support fluid 14 higher in pressure than the flue gas 3, and the secondary combustion support fluid 12 in the secondary-combustion-support-fluid flow passage 23 adjacent to the flue gas flow passage 21 and higher in pressure than the flue gas 3. Usually, the primary combustion support fluid 14 is set to have pressure higher than that of the secondary combustion support fluid 12.

The regenerative rotary preheater 2 further comprises an oxygen flow passage 27 through which passed is the oxygen 17 and which is between the primary- and secondary-combustion-support-fluid flow passages 22 and 23. Thus, the regenerative rotary preheater 2 has the four flow passages for heat exchange. Though the oxygen 17 passed through the oxygen flow passage 27 may be set to have any pressure, it is preferable that the oxygen 17 is set to have a pressure lower than those of the secondary and primary combustion support fluids 12 and 14 passed through the secondary- and primary-combustion-support-fluid flow passages 23 and 22, respectively.

Next, mode of operation of the above embodiment will be described.

In FIG. 2, upon oxyfuel combustion in the oxyfuel combustion boiler 1, part of the flue gas 3 on the entry side of the induced draft fan 5 is drawn as recirculated flue gas and is boosted in pressure by the forced draft fan 11 (FDF) to provide the secondary combustion support fluid 12. The secondary combustion support fluid 12 is introduced into the secondary-combustion-support-fluid flow passage 23 in the regenerative rotary preheater 2, is heat exchanged with the flue gas 3 and then is supplied to the oxyfuel combustion boiler 1.

Part of the flue gas 3 boosted in pressure by the boost-up fan 7 is drawn as recirculated flue gas and is further boosted in pressure by the primary draft fan 13 to provide the primary combustion support fluid 14. The part 14a of the primary combustion support fluid 14 is passed through the regenerative rotary preheater 2 and the remaining part 14b bypasses the regenerative rotary preheater 2 and joins to the fluid for control in temperature thereof. Then, the primary combustion support fluid 14 controlled in temperature is guided to the mill 15 for drying of the coal and for transport of the pulverized coal to the oxyfuel combustion boiler 1.

The oxygen 17 produced in the air separation unit 16 (ASU) and maintained to a predetermined pressure is introduced through the oxygen supply flow passage 17' to the oxygen flow passage 27 in the regenerative rotary preheater 2 and is preheated through heat exchange with the flue gas 3. The preheated oxygen 17 is mixed at the oxygen mixing section 19 with the preheated secondary combustion support fluid 12 and then is supplied to the oxyfuel combustion boiler 1.

Thus, the primary combustion support fluid 14 and the secondary combustion support fluid 12 mixed at the oxygen mixing section 19 with the oxygen 17 are supplied to the oxyfuel combustion boiler 1 as oxyfuel combustor 100 so that the fuel is burned by the primary and secondary combustion support fluids 14 and 12 to operate the oxyfuel combustion boiler 1.

In the above, the description has been made on oxyfuel combustion in the oxyfuel combustion boiler 1. Upon activation of the oxyfuel combustion boiler 1, in the situation of FIG. 2, the flow rate controlling dampers 30a and 32a are closed and the flow rate controlling dampers 30b and 32b are opened to supply air 28 to the secondary-combustion-support-fluid flow passage 23 and oxygen flow passage 27 in the regenerative rotary preheater 2 to thereby activate the oxyfuel combustion boiler 1 using air combustion. Once the operation of the oxyfuel combustion boiler 1 is stabilized in the air combustion, the air combustion is switched to the oxyfuel combustion.

Since the oxygen flow passage 27 is between the primary- and secondary-combustion-support-fluid flow passages 22 and 23 as mentioned in the above, prevented is the oxygen 17 in the oxygen flow passage 27 from directly leaking to the flue gas flow passage 21 and being uselessly expended. Specifically, the oxygen 17 is set to have the pressure lower than those of the secondary and primary combustion support fluids 12 and 14 so that, even if the primary and secondary combustion support fluids 14 and 12 in the primary- and secondary-combustion-support-fluid flow passages 22 and 23 have direct leaks DL2 to the oxygen flow passage 27, the oxygen 17 in the oxygen flow passage 27 does not directly leak to the primary- and secondary-combustion-support-fluid flow passages 22 and 23. Thus, the oxygen 17 is prevented from directly leaking to the flue gas flow passage 21. If the oxygen 17 is set to have a pressure not less than those of the secondary and primary combustion support fluids 12 and 14, it might be conceivable that the oxygen 17 in the oxygen flow passage 27 has direct leak in given quantity to the primary- and secondary-combustion-support-fluid flow passages 22 and 23; however, the oxygen 17 directly leaking to the primary- and secondary-combustion-support-fluid flow passages 22 and 23 is supplied to the oxyfuel combustion boiler 1 and thus is not uselessly consumed.

From the primary-combustion-support-fluid flow passage 22 adjacent to the flue gas flow passage 21, the primary combustion support fluid 14 has direct leak DL1 in great quantity to the flue gas flow passage 21. However, from the secondary-combustion-support-fluid flow passage 23 adjacent to the flue gas flow passage 21, the secondary combustion support fluid 12 has direct leak DL2 only in medium quantity to the flue gas flow passage 21. Thus, in comparison with the conventional device as shown Patent Literature 1 where, from both of the primary-combustion-support-fluid flow passages adjacent to the flue gas flow passage, the primary combustion support fluids have direct leak in great quantity to the flue gas flow passage, the device according to the disclosure can reduce a whole quantity of the combustion support fluid leaking to the flue gas flow passage 21. Thus, according to the construction of the regenerative rotary preheater 2 shown in FIGS. 2 and 3, fan motivity and installation cost can be reduced in comparison with those of Patent Literature 1 in connection with sum of capabilities of the primary draft and boost-up fans 13 and 7.

In the device shown in FIG. 2, premixing mode may be applied where upon oxyfuel combustion in the oxyfuel combustion boiler 1, part of the secondary combustion support fluid 12 is supplied to the oxygen 17 in the oxygen supply flow passage 17' for premixing and the oxygen 17 controlled in concentration by the premixing is supplied to the oxygen flow passage 27 in the regenerative rotary preheater 2.

In the premixing mode, the flow rate controlling damper 32b in the communication passage 31 is utilized as oxygen concentration controller 18 for control in quantity of the secondary combustion support fluid 12 to be premixed into the oxygen supply flow passage 17' to control an oxygen concentration of the oxygen 17 supplied to the oxygen flow passage 27.

Here, the control is made by the oxygen concentration controller 18 such that the oxygen 17 from the air separation unit 16 is made equivalent in pressure to the secondary combustion support fluid 12 from the communication passage 31. As a result, the mixed fluid of the oxygen 17 with the secondary combustion support fluid 12 lower in pressure than the primary and secondary combustion support fluids 14 and 12 in the primary- and secondary-combustion-support-fluid flow passages 22 and 23 is supplied to the oxygen flow passage 27.

The respective fluids guided to the regenerative rotary preheater 2, i.e., the primary and secondary combustion support fluids 14 and 12 and the oxygen 17 have a flow rate ratio of, for example, about 1:2:1. Thus, an area ratio between the primary- and secondary-combustion-support-fluid flow passages 22 and 23 and the oxygen flow passage 27 in the regenerative rotary preheater 2 is similarly set to 1:2:1. Here, when for example 50% in quantity of the secondary combustion support fluid 12 is premixed to the oxygen 17 through the communication passage 31, then the primary and secondary combustion support fluids 14 and 12 and the mixed fluid of the oxygen 17 with the secondary combustion support fluid 12 can have a flow rate ratio of about 1:1:2. Thus, the mixed fluid of the oxygen 17 with the secondary combustion support fluid 12 guided to the oxygen flow passage 27 in the regenerative rotary preheater 2 can have a reduced oxygen concentration of 50%. Specifically, application of the premixing mode to the FIG. 2 embodiment with 100% of the oxygen 17 introduced into the oxygen flow passage 27 can reduce the concentration of the oxygen 17 introduced into the oxygen flow passage 27 down to 50%. Thus, the mixed fluid of the oxygen 17 with the secondary combustion support fluid 12 introduced into the regenerative rotary preheater 2 has the reduced oxygen concentration, which lowers a possibility of spontaneous combustion due to high-purity oxygen to enhance safeness.

As mentioned in the above, the embodiment shown in FIGS. 2 and 3 has excellent effects that leaking of oxygen to the flue gas 3 can be prevented with a simple structure and that motivity for the forced draft fan 11 to supply the secondary combustion support fluid 12 to the oxyfuel combustor 100 can be reduced.

Recited as the oxyfuel combustor 100 is the oxyfuel combustion boiler 1 adapted to withdraw $CO_2$. Application to the regenerative rotary preheater 2 in such oxyfuel combustion boiler 1 can reduce dilution of $CO_2$ due to leaking of oxygen.

It is to be understood that a combustion-support-fluid preheating device for an oxyfuel combustor according to the disclosure is not limited to the above embodiment and that various changes and modifications may be made without departing from the scope of the disclosure. For example, it may be applied to preheating of combustion support fluid in an oxyfuel combustor other than an oxyfuel combustion boiler.

REFERENCE SIGNS LIST 1 oxyfuel combustion boiler (oxyfuel combustor)
2 regenerative rotary preheater
3 flue gas
12 secondary combustion support fluid
12' secondary-combustion-support-fluid supply flow passage
14 primary combustion support fluid
16 air separation unit
17 oxygen
17' oxygen supply flow passage
18 oxygen concentration controller
19 oxygen mixing section
21 flue gas flow passage
22 primary-combustion-support-fluid flow passage
23 secondary-combustion-support-fluid flow passage
26 rotor
27 oxygen flow passage
31 communication passage
32b flow rate controlling damper (oxygen concentration controller)
100 oxyfuel combustor

The invention claimed is:

1. A combustion-support-fluid preheating device for an oxyfuel combustion system, comprising:
   a regenerative rotary preheater comprising:
      a flue gas flow passage through which passed is flue gas from an oxyfuel combustor,
      a primary-combustion-support-fluid flow passage adjacent to the flue gas flow passage and through which passed is primary combustion support fluid with higher pressure than that of the flue gas,
      a secondary-combustion-support-fluid flow passage adjacent to the flue gas flow passage and through which passed is secondary combustion support fluid with higher pressure than that of the flue gas, and
      an oxygen flow passage between the primary- and secondary-combustion-support-fluid flow passages and through which oxygen is passed; and
   an oxygen mixing section where the secondary combustion support fluid preheated through passing thereof through the secondary-combustion-support-fluid flow passage is mixed with the oxygen preheated through passing thereof through the oxygen flow passage and is supplied to the oxyfuel combustor.

2. The combustion-support-fluid preheating device for the oxyfuel combustion system as claimed in claim 1, wherein the oxyfuel combustor is an oxyfuel combustion boiler.

3. The combustion-support-fluid preheating device for the oxyfuel combustion system as claimed in claim 1, wherein a flow rate ratio of the primary combustion support fluid, the secondary combustion support fluid, and the oxygen is 1:2:1.

4. The combustion-support-fluid preheating device for the oxyfuel combustion system as claimed in claim 1, wherein a pressure of the primary combustion support fluid is higher than a pressure of the secondary combustion support fluid, and the pressure of the second combustion support fluid is higher than a pressure of the oxygen.

5. The combustion-support-fluid preheating device for the oxyfuel combustion system as claimed in claim 1, further comprising:
   a communication passage for connecting a secondary-combustion-support-fluid supply flow passage for supply of the secondary combustion support fluid to the secondary-combustion-support-fluid flow passage in the regenerative rotary preheater and an oxygen supply flow passage for supply of the oxygen to the oxygen flow passage in the regenerative rotary preheater,
   the communication passage being provided with oxygen concentration controller for premixing part of the secondary combustion support fluid in the secondary combustion support fluid supply flow passage into the oxygen supply flow passage to control an oxygen concentration in the oxygen flow passage.

6. The combustion-support-fluid preheating device for the oxyfuel combustion system as claimed in claim 5, wherein the oxyfuel combustor is an oxyfuel combustion boiler.

* * * * *